United States Patent
Lin et al.

(10) Patent No.: US 8,345,361 B2
(45) Date of Patent: Jan. 1, 2013

(54) PROJECTING DEVICE AND LENS ADJUSTING MODULE THEREOF

(75) Inventors: Huan-Yu Lin, Taichung County (TW); Sheng-wen Hu, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 71 days.

(21) Appl. No.: 12/954,664

(22) Filed: Nov. 25, 2010

(65) Prior Publication Data

US 2011/0122503 A1 May 26, 2011

(30) Foreign Application Priority Data

Nov. 26, 2009 (TW) .............................. 98140306 A

(51) Int. Cl.
  *G02B 7/02* (2006.01)
  *G03B 3/00* (2006.01)
  *F16M 13/00* (2006.01)
(52) U.S. Cl. ......... 359/813; 353/101; 359/819; 248/420
(58) Field of Classification Search ............... 248/188.2, 248/416, 419, 420; 353/70, 100, 101, 119; 359/393, 813, 819, 822
  See application file for complete search history.

(56) References Cited

U.S. PATENT DOCUMENTS

| 6,755,540 | B1 * | 6/2004 | Runco ........................... 353/101 |
| 6,909,560 | B2 * | 6/2005 | Lin et al. ........................ 359/813 |
| 6,966,671 | B2 * | 11/2005 | Lee et al. ....................... 362/285 |
| 7,950,810 | B2 * | 5/2011 | Liao et al. ....................... 353/101 |
| 8,038,307 | B2 * | 10/2011 | Kitahara et al. ............... 353/101 |
| 8,172,408 | B2 * | 5/2012 | Fujiwara et al. .............. 353/101 |
| 2009/0002645 | A1 | 1/2009 | Lee et al. |

FOREIGN PATENT DOCUMENTS

| CN | 2552025 | 5/2003 |
| CN | 2593233 | 12/2003 |
| TW | 200900836 A1 | 1/2009 |

OTHER PUBLICATIONS

Counterpart Office Action of China Patent Office cited on Apr. 20, 2011.

* cited by examiner

*Primary Examiner* — David N Spector

(57) ABSTRACT

The invention discloses a lens adjusting module for adjusting the position of a lens module. The lens adjusting module includes an input rod and an output rod, wherein the input rod is configured along a first direction and has an inclined surface. The output rod is configured along a second direction perpendicular to the first direction. The output rod has a first contact surface contacting the inclined surface, and a second contact surface contacting the lens module. When the input rod moves along the first direction, the first contact surface of the output rod moves along the inclined surface of the input rod, and the lens module moves with the output rod along the second direction.

19 Claims, 6 Drawing Sheets

PROJECTING DEVICE AND LENS ADJUSTING MODULE THEREOF

BACKGROUND OF INVENTION

1. Field of the Invention

The present invention relates generally to a projecting device and the lens adjusting module thereof. Particularly, the present invention relates to a lens adjusting module capable of adjusting the position of lens and a projecting device having the same.

2. Description of the Prior Art

Among projectors in current markets, the lens module is generally fixed on the projector. If users want to adjust the position of the projected image on the screen, they have to change the relative position between the projector and the screen. Users must expend time and be patient to correctly adjust the position and angle of the projector so that the projected image on the screen is at optimal viewing.

After determining the position of the projector, if users want to heighten the projected image on the screen, they must adjust the front stands of the projector to increase the projection elevation angle. However, adjusting the height of the front stands will change the relative angle between the lens and the screen and result in image distortion. For example, a rectangular image projected previously is distorted in a trapezoidal fashion.

To resolve the mentioned problems, several lens adjusting devices for the projector have been developed. By adjusting the position of the lens, users can easily shift projected images up or down on the screen without image distortion effects.

For instance, Taiwan Patent Publication No. 200900836 illustrates a lens-shifting device of a projector, which discloses gear sets, a sliding plate, and fixing rods to smoothly and accurately move the lens disposed on the sliding plate along the fixing rod. In this manner, minute adjustment of the lens position can be achieved.

However, the prior art lens-adjusting device has an overly complicated design, making the adjusting device bulky, heavy, and cost ineffective. As a result, conventional lens-adjusting devices are not widely adopted in projectors targeted to miniaturization and personalization. Additionally, the projector structure would need to be heavily modified to accommodate the complicated design of the prior art lens-adjusting device, which causes that the projector cannot adapt to various types of lens. Therefore, the practicality is significantly restricted.

SUMMARY OF INVENTION

It is an object of the present invention to provide a lens adjusting module capable of adjusting the position of projector lens to solve the above mentioned problems.

The present invention achieves these and other objectives by providing an embodiment of the lens adjusting module. The lens adjusting module includes an input rod, and an output rod. The input rod is disposed along a first direction and has an inclined surface. The output rod is disposed along a second direction perpendicular to the first direction. The output rod has a first contact surface and a second contact surface. The first contact surface contacts the inclined surface of the input rod and the second contact surface contacts a lens module.

It is another object of the present invention to provide a projecting device, including a lens adjusting module for easy adjusting of the position of the lens module.

The present invention achieves these and other objectives by providing an embodiment of the projecting device. The projecting device includes an optical engine, a lens module, and a lens adjusting module. The lens module includes a lens, and a fixing component connected to the lens. The lens is connected to the optical engine by means of the fixing component. The lens adjusting module includes an input rod and an output rod. The input rod is disposed along the first direction and has an inclined surface. The output rod is disposed along the second direction, perpendicular to the first direction. In addition, the output rod has a first contact surface and a second contact surface. The first contact surface contacts the inclined surface of the input rod. The second contact surface contacts the lens module.

In these embodiments of the present invention, when users move the input rod and the inclined surface along the first direction, the first contact surface of the output rod moves along the inclined surface of the input rod, and the lens module moves with the output rod along the second direction. As a result, the position of the lens module can be adjusted by operating the input rod.

DETAILED DESCRIPTION OF THE PREFERRED EMBODIMENT

Figure 1A:
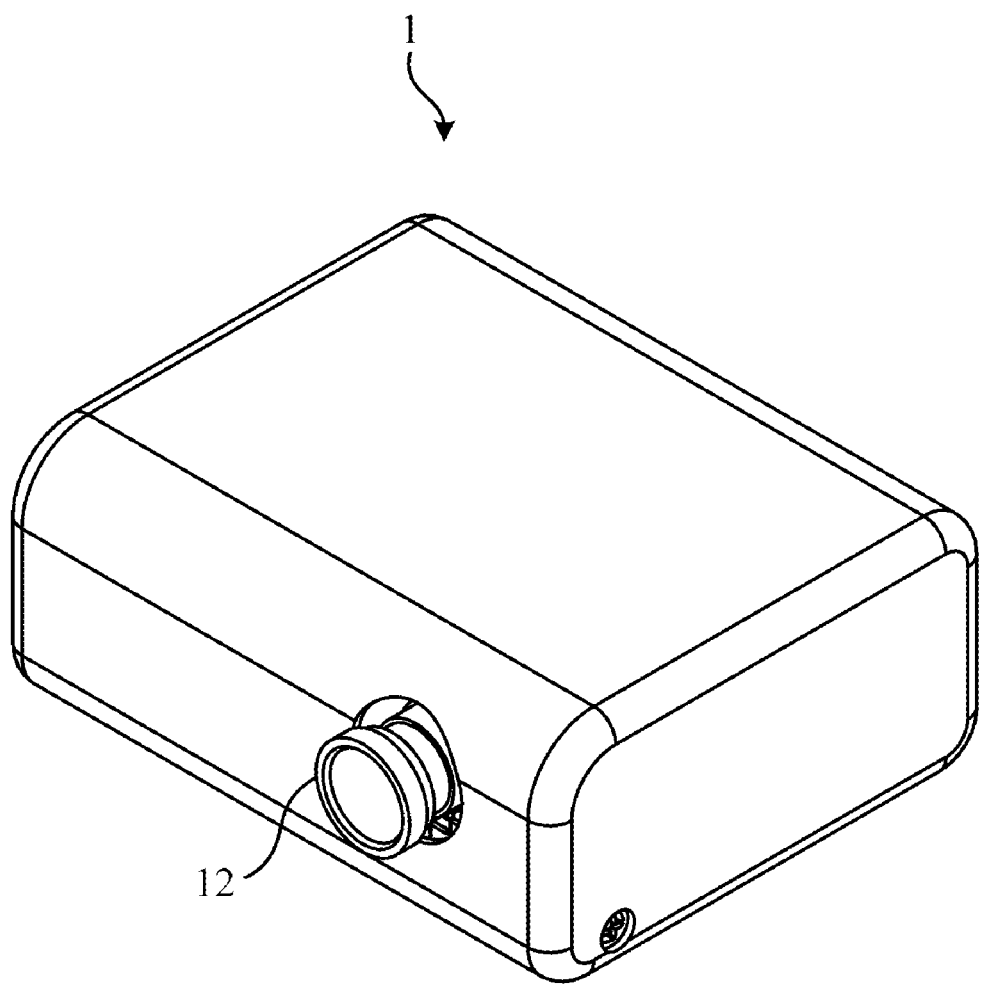
FIG. 1A is a perspective view of an embodiment of the present invention.
Figure 1B:
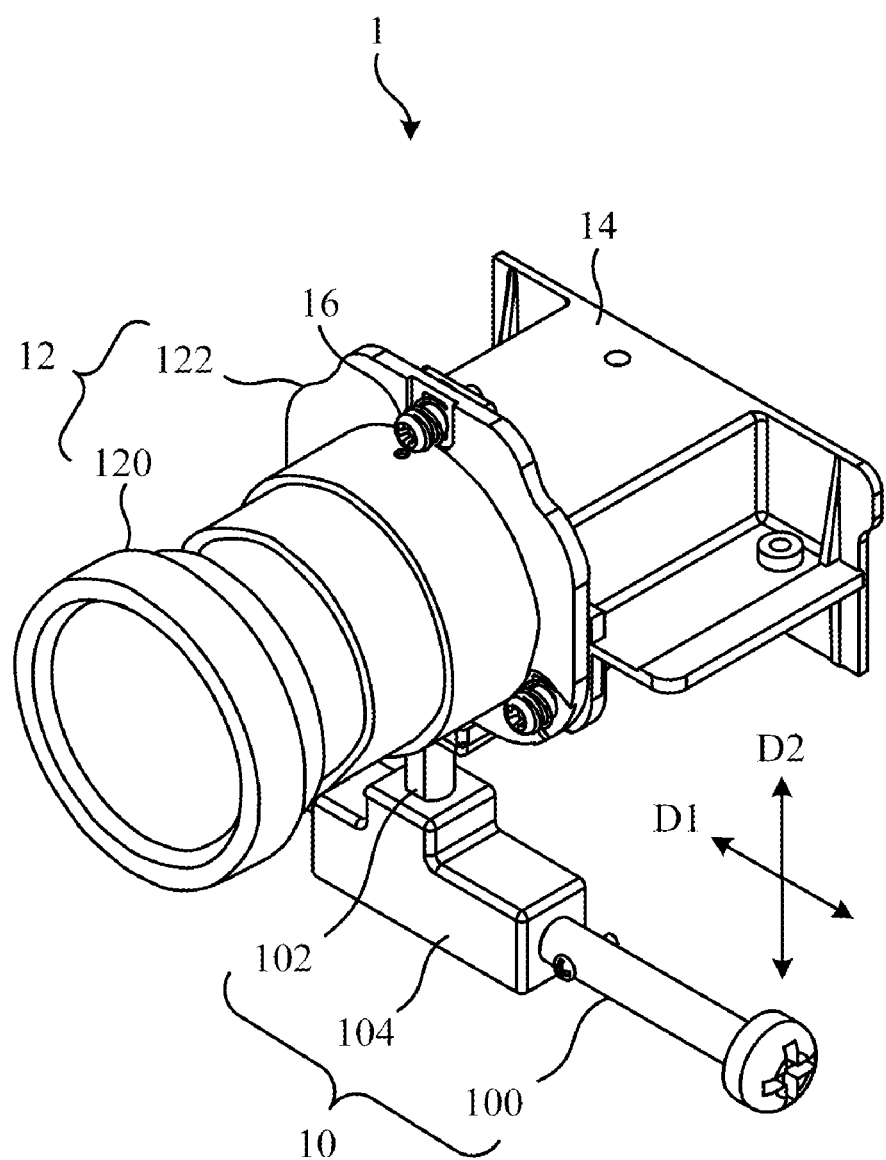
FIG. 1B is a partial perspective view of the internal portions of the projecting device in FIG. 1A.

The preferred embodiment of the present invention is illustrated in FIGS. 1A and 1B. FIG. 1A is a perspective view of projecting device 1. FIG. 1B is a partial perspective view of an internal portion of FIG. 1A. As shown in FIG. 1B, the projecting device 1 includes a lens adjusting module 10, a lens module 12, and an optical engine 14. The lens adjusting module 10 connects to the lens module 12 and the lens module 12 is connected to the optical engine 14. In practice, the optical engine 14 includes a light source and a plurality of optical components to provide the required projecting light for the projecting device.

In the present embodiment, the lens module 12 includes a lens 120 and a fixing component 122 connected to the lens 120. The lens 120 is also connected to the optical engine 14 by means of the fixing component 122. In practice, lights from the light source in the optical engine 14 pass through the lens 120 of the lens module 12 and projects out of the projecting device 1.

The lens adjusting module 10 is connected to the lens module 12 to adjust the position of the lens module 12. The lens adjusting module 10 includes an input rod 100, an output rod 102, and a casing 104. The input rod 100 is disposed along a first direction D1, and the output rod 102 is disposed along a second direction D2 that is perpendicular to the first direction D1. The input rod 100 and the output rod 102 are partially encased in the casing 104 which protects the input rod 100 and the output rod 102 and restricts their direction of movement.

Figure 2:
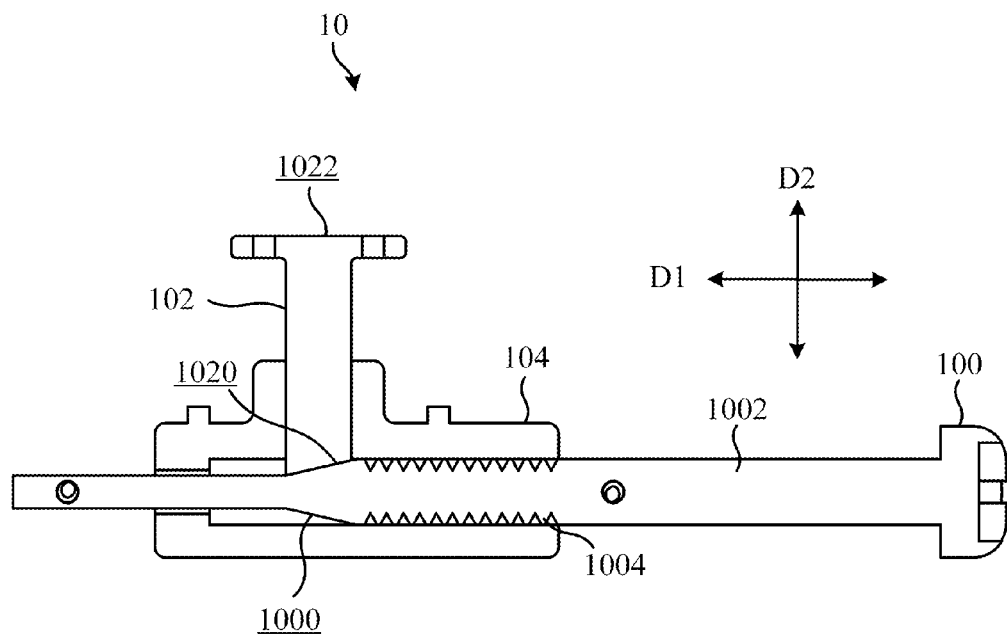
FIG. 2 is a cross-sectional view of the lens adjusting module of FIG. 1.

FIG. 2 is a cross-sectional view of the lens adjusting module 10 referenced in FIG. 1B. As shown in FIG. 2, the input rod 100 of the lens adjusting module 10 has an inclined surface 1000 and the output rod 102 has a first contact surface 1020 connecting the inclined surface 1000. In the present embodiment, the inclined surface 1000 is a conical surface. The first contact surface 1020 may correspondingly be a curvature surface or a plane.

In the present embodiment, the input rod 100 further includes a shaft 1002, connected to the inclined surface 1000. The shaft 1002 penetrates through the casing 104 and is partially disposed within the casing 104. Additionally, the shaft 1002 has a first thread 1004 that is engaged with the casing 104. Users can operate the input rod 100 to move the shaft 1002 in the first direction D1. For example, users can rotate the shaft 1002 by the first thread 1004 to move the shaft 1002 along the first direction D1. Through the pitch of first thread 1004, users can precisely control the moving distance along the first direction D1 of the shaft 1002. In addition, a motor may be connected to the shaft 1002 to replace users' manual operation. In other embodiments, the shaft 1002 may have a smooth surface without the first thread 1004, and users directly push or pull the input rod to adjust the moving distance of the shaft along the first direction D1.

As the inclined surface 1000 moves with the shaft 1002 along the first direction D1, the first contact surface 1020 of the output rod 102 moves along the inclined surface 1000, and the output rod 102 moves along the second direction D2. The output rod 102 has a second contact surface 1022 that contacts the lens module 12. As a result, the lens module 12 moves with the output rod 102 along the second direction D2.

In short, the lens adjusting module 10 utilizes the input rod 100 and the output rod 102 to adjust the position of the lens module 12. In practice, the input rod 100 and the output rod 102 may be made from metal to provide support strength for the lens module 12.

In the mentioned embodiment of the present invention, the inclined surface 1000 and the first contact surface 1020 contact each other. When the input rod 100 moves along the first direction D1, the first contact surface 1020 correspondingly moves with respect to the inclined surface 1000 in a sliding motion.

Figure 3:
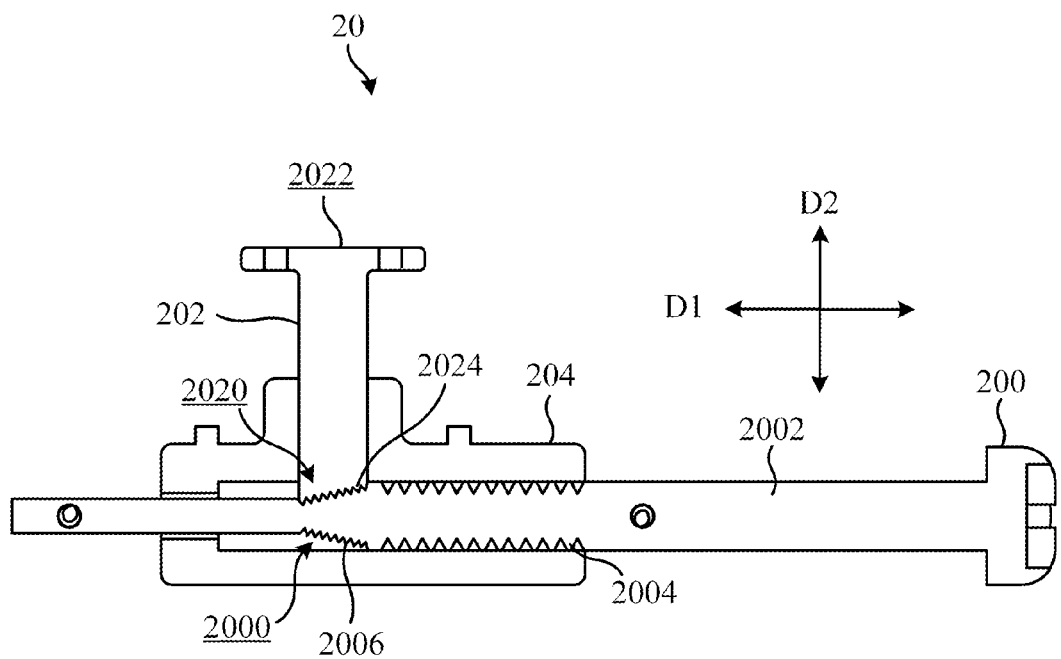
FIG. 3 is a cross-sectional view of the lens adjusting module in another embodiment of the present invention.

FIG. 3 is a cross-sectional view of another embodiment of the lens adjusting module 20. The detailed description of the operation in the embodiment is omitted since it is substantially identical to that in the aforementioned embodiment. As shown in FIG. 3, the present embodiment differs from the aforementioned embodiment in that the inclined surface 2000 of the input rod 200 has a second thread 2006, and the first contact surface 2020 of the output rod 202 has a third thread 2024 correspondingly. The second thread 2006 engages with the third thread 2024.

When a user manually, or through a motor, rotates the input rod 200, the shaft 2002 rotates and moves along the first direction D1 by the first thread 2004. Besides, the second thread 2006 on the inclined surface 2000 rotatably engages with the third thread 2024 on the first contact surface 2020, which causes the first contact surface 2020 to move on the inclined surface 2000 and the output rod 202 moves along the second direction D2 as a result.

When the projecting device is set on the table, users move the input rod toward the casing, the output rod will correspondingly move upwards and raise the lens module, and vice versa. In practice, the projecting devices may also be inverted and hung upside-down on the ceiling for image projection, and the weight of the lens module and output rod would not return the lens module and the output rod to their original position. Therefore, projecting devices that can project under normal and inverted positions would require another support source for the lens module to move back and forth along the second direction D2.

Figure 4:
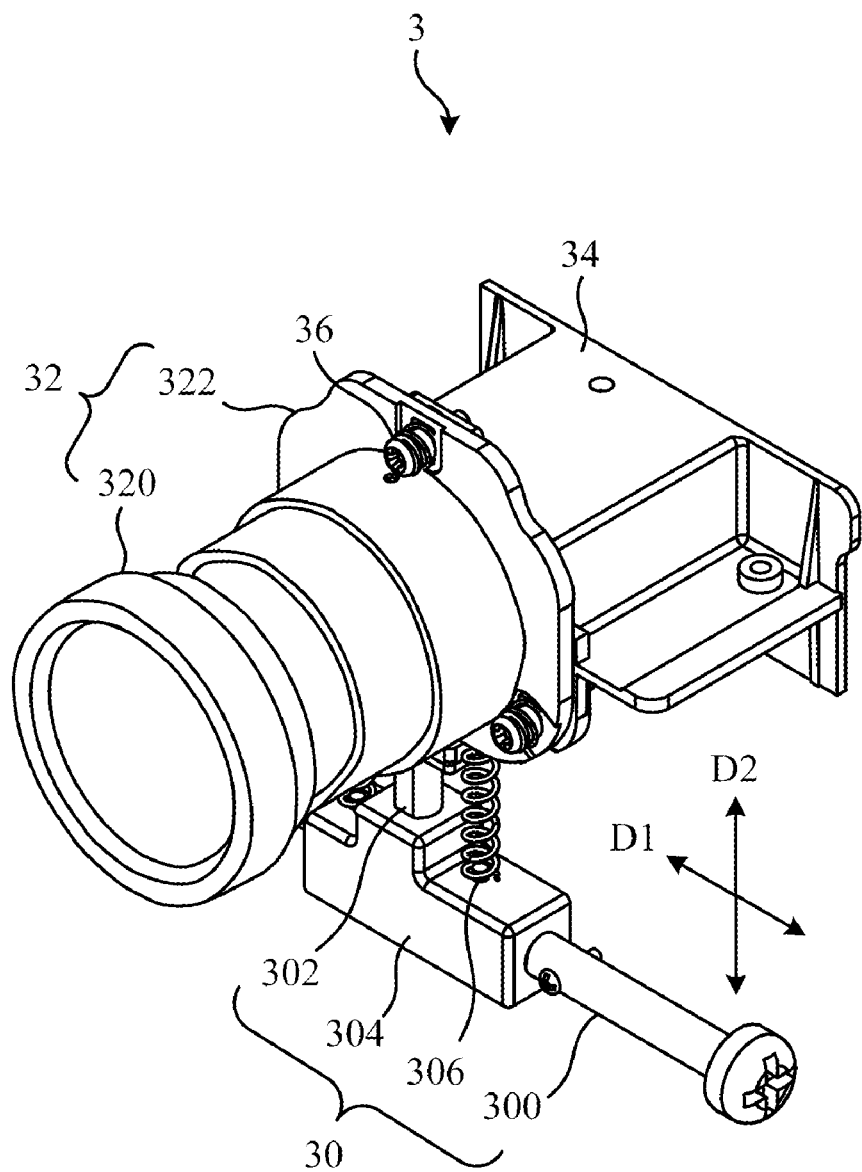
FIG. 4 is a schematic view of the lens adjusting module in another embodiment of the present invention.

FIG. 4 is a perspective view of the lens adjusting module 30 in another embodiment. As shown in FIG. 4, the projecting device 3 includes a lens adjusting module 30, a lens module 32, and an optical engine 34. The lens adjusting module 30 is connected to the lens module 32, and the lens module 32 is further connected to the optical engine 34.

In the present embodiment, the lens adjusting module 30 includes an input rod 300, an output rod 302, a casing 304, and an elastic component 306. In comparison to the aforementioned embodiments, the present embodiment further includes the elastic component 306. The elastic component 306 is disposed generally along the second direction D2, with two ends connected to the casing 306 and the lens module 32, respectively. It should be understood that although two elastic components 306 are implemented in the present embodiment, the present invention makes no limitations in regards to the quantity or position of the elastic component 306. In practice, the quantity and position of the elastic component 306 can be varied according to design demands.

When the projecting device 3 in the present embodiment is placed on a table (normal position), if users move the input rod 300 toward the casing 304, the lens module 32 will be raised by the output rod 304 along the second direction D2 and the elastic component 306 will be elongated; if users move the input rod 300 outward the casing 304, due to the weight of the lens module 32 and the output rod 302 as well as the recovering elastic force provided by the elastic component 306, the lens module 32 and the output rod 302 will move downwards along the second direction D2.

When the projecting device 3 in the present embodiment is hung upside-down on the ceiling, if users move the input rod 300 toward the casing 304, the lens module 32 will be pushed downwards (i.e., move away from the casing 304) by the output rod 304 along the second direction D2; if users move the input rod 300 outward the casing 304, the lens module 32 will be raised (i.e., move toward the casing 304) by means of the recovering elastic force provided by the elastic component 306 and the output rod 302.

In short, with the elastic component 306 implemented, users can move the lens module 32 back and forth along the second direction D2 by means of the input rod 300, whether the projection device 3 is place in the normal or inverted positions.

Figure 5:
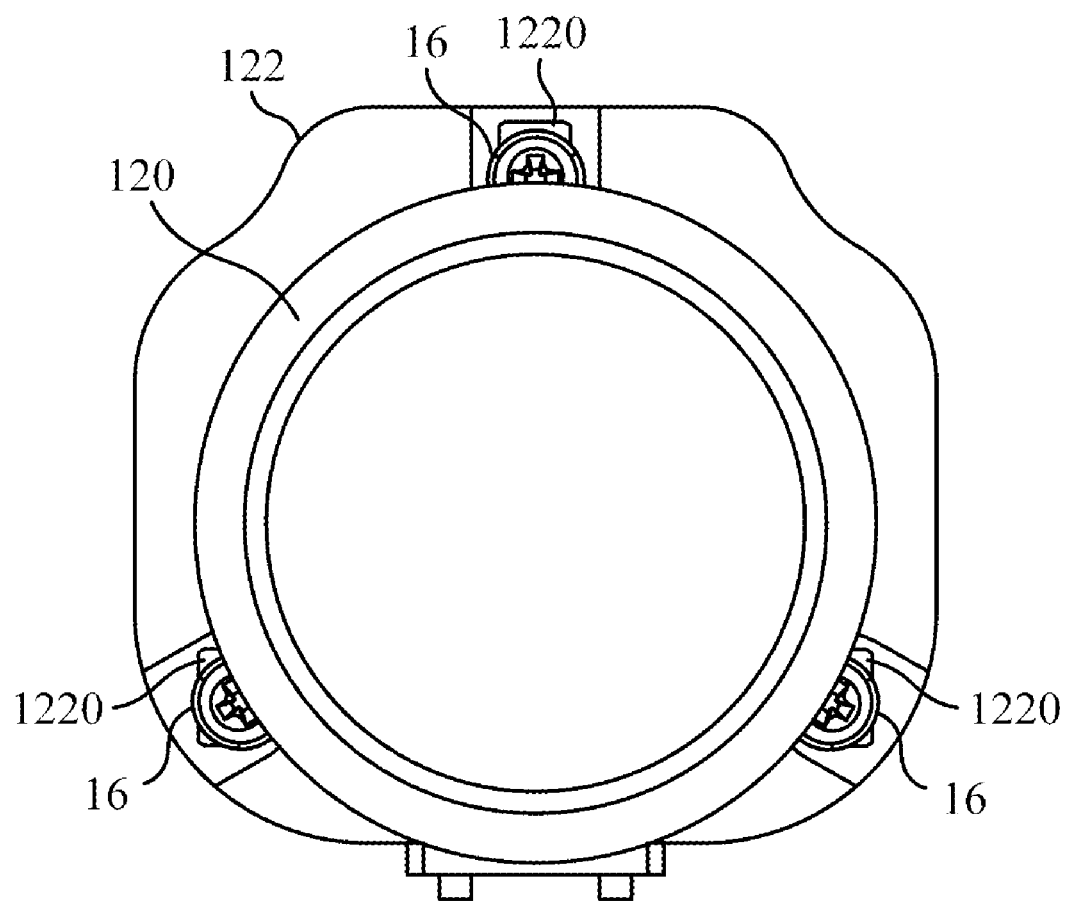
FIG. 5 is a schematic view of the fixing component in FIG. 1B.

In prior arts, the lens module is unmovable and fixed on the optical engine. Conventionally, the fixing component of lens modules consists of screw holes and screws to fix the lens module directly onto the optical engine. However, in the present invention, the fixing component can readily move with the lens module. Referring to the schematic view of fixing component 122 in FIG. 5 in conjunction with FIG. 1B, the fixing component 122 has at least one slot 1220 extended along the second direction D2, and at least one screw 16 penetrating through the slot 1220 and fixed onto the optical engine 14. Therefore, by fixing the screw 16 to the optical engine 14 through the slot 1220 of the fixing component 122, the lens module 12 (the lens 120 and the fixing component 122) is connected to the optical engine 14 and adjustable along the second direction D2.

In comparison to the prior art, the lens adjusting module and the projecting device of the present invention allow users to easily adjust the position of the lens module by a simple and inexpensive design. Users may accurately adjust the position of the lens module by threads. Besides, it is not necessary to heavily modify the structure of the projecting device of the present invention, which increases choices of lens module during manufacturing.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A lens adjusting module for adjusting a position of a lens module, comprising:
    an input rod, disposed along a first direction, the input rod having an inclined surface; and
    an output rod, disposed along a second direction perpendicular to the first direction, the output rod including a first contact surface and a second contact surface, the first contact surface contacting the inclined surface and the second contact surface contacting the lens module;
    wherein as the input rod moves along the first direction, the first contact surface of the output rod moves along the inclined surface of the input rod, and the lens module moves with the output rod along the second direction.

2. The lens adjusting module of claim 1, wherein the input rod is made of metal.

3. The lens adjusting module of claim 1, further comprising a casing accommodating a portion of the input rod and a portion of the output rod, wherein the inclined surface and the first contact surface are disposed within the casing.

4. The lens adjusting module of claim 3, further comprising an elastic component connecting the casing to the lens module along the second direction.

5. The lens adjusting module of claim 3, wherein the input rod further comprises a shaft connected to the inclined surface.

6. The lens adjusting module of claim 5, wherein the shaft is connected to a motor.

7. The lens adjusting module of claim 5, wherein the shaft passes through a through hole in the casing, and the shaft has a first thread for engaging with the casing as the shaft passes through the through hole.

8. The lens adjusting module of claim 7, wherein the inclined surface is a conical surface.

9. The lens adjusting module of claim 8, wherein the conical surface has a second thread, the first contact surface has a third thread for engaging with the second thread.

10. A projecting device, comprising:
    an optical engine;
    a lens module, comprising a lens and a fixing component connected to the lens, the lens connecting to the optical engine through the fixing component; and
    a lens adjusting module, comprising:
        an input rod, disposed along a first direction, the input rod having an inclined surface; and
        an output rod, disposed along a second direction perpendicular to the first direction, the output rod including a first contact surface and a second contact surface, the first contact surface contacting the inclined surface, the second contact surface contacting the lens module;
        wherein as the input rod moves along the first direction, the first contact surface of the output rod moves along the inclined surface of the input rod, and the lens module moves with the output rod along the second direction.

11. The projecting device of claim 10, wherein the input rod is made of metal.

12. The projecting device of claim 10, further comprising:
    at least one slot extended along the second direction and formed on the fixing component; and
    a screw, penetrating the slot of the fixing component and being fastened to the optical engine;
    wherein the lens is fastened onto the fixing component, and the fixing component connects to the optical engine by the slot and the screw and is movable along the second direction relative to the optical engine.

13. The projecting device of claim 10, wherein the lens adjusting module further comprises a casing accommodating a portion of the input rod and a portion of the output rod, and the inclined surface and the first contact surface are disposed within the casing.

14. The projecting device of claim 13, wherein the lens adjusting module further comprises an elastic component connecting the casing to the lens module along the second direction.

15. The projecting device of claim 13, wherein the input rod further comprises a shaft connected to the inclined surface.

16. The projecting device of claim 15, wherein the shaft is connected to a motor.

17. The projecting device of claim 15, wherein the shaft passes through a through hole in the casing, and the shaft has a first thread for engaging with the casing as the shaft passes through the through hole.

18. The projecting device of claim 17, wherein the inclined surface is a conical surface.

19. The projecting device of claim 18, wherein the conical surface has a second thread, and the first contact surface has a third thread for engaging with the second thread.

* * * * *